INVENTOR
RICHARD T. COEN

BY William Grobman

ATTORNEY

United States Patent Office 3,524,019
Patented Aug. 11, 1970

3,524,019
ELECTRONIC SYSTEM FOR VARYING FOG SIMULATION WITH CHANGES IN DIRECTION OF SIGHT
Richard T. Coen, Binghamton, N.Y., assignor to Singer-General Precision, Inc., Binghamton, N.Y., a corporation of Delaware
Filed Aug. 9, 1966, Ser. No. 571,278
Int. Cl. H04n 5/34, 7/18
U.S. Cl. 178—6.8      3 Claims

ABSTRACT OF THE DISCLOSURE

In a visual display system in which television is used to generate images being displayed, this system introduces fog effects which take into account the direction of the apparent line of sight. Fog is simulated by lightening the entire picture. However, a film having a light transmission density which varies vertically as the secant is scanned by a flying spot synchronized with the television beams. The light passed by the film controls the instantaneous lightening or fog effects. The system includes means for varying the film and flying spot scanning orientation to further simulate the effects of pitch and roll on the simulated fog.

---

This invention relates to a system for modifying visual displays to simulate special conditions.

One of the more common fields in which visual displays are being used to an increasing extent is in simulation, where apparatus is used to train personnel in the proper operation of equipment which is too expensive or otherwise unsuitable for use in direct training. As industrial plants become more and more automated and the automatic equipment contained therein becomes more and more complex, and as the vehicles used in modern transportation systems, particularly in aviation, grow in size, complexity, and cost, the requirements for preoperation training become more stringent. An important aspect of simulation equipment is the creation of a realistic atmosphere and situation. Since man uses his eyes as a means to receive information to a greater extent than he uses any other of his sensory organs, visual simulation is becoming more and more important in creating this realistic atmosphere and situation.

Simulators have been used for many years to train pilots and other members of aircraft crews. Some of the earliest devices used in the training of aircraft crew members were star field generators which presented to the trainees a field of stars which they could use to navigate their craft. Simulation equipment for training purposes has grown in use with the growth of the aircraft industry and with the growth of space travel achievements. It is desirable to present a trainee pilot, for example, with a simulated visual field which displays adverse weather conditions. One of the most important of the adverse weather conditions with which a pilot must become familiar is fog.

One of the basic objects of this invention is to provide new and improved apparatus for realistically simulating fog conditions.

It is another object of this invention to provide new and improved visual simulation equipment.

It is still another object of this invention to provide new and improved equipment for simulating fog conditions, which simulation appears to have the same characteristics as fog in its natural environment.

Other objects and advantages of this invention will become apparent as the following description proceeds, which description should be considered together with the accompanying drawings in which.

Figure 1:
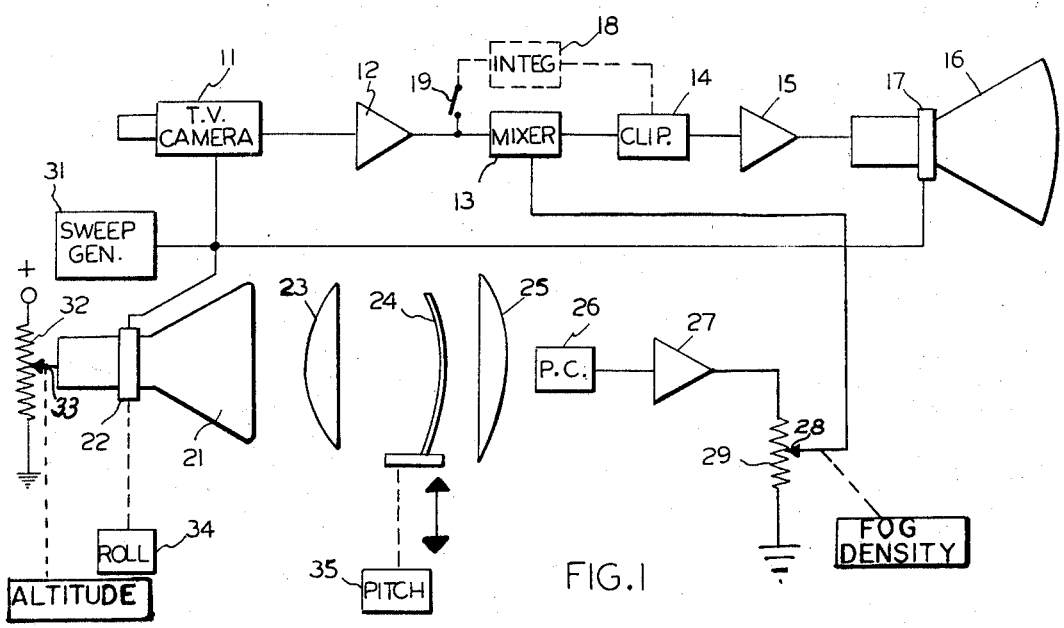
FIG. 1 is a block diagram of one system for visually simulating fog conditions.

Fog may not be uniform in its density, but may vary with its elevation or distance from the earth's surface. In a heavy fog, known in the vernacular as "pea soup," layering sometimes occurs, and the fog is denser at one distance from the earth's surface than it is at other elevated positions. In other words, if an individual looks horizontally towards a group of objects, they appear to him to be obscured by an amount which seems to be directly proportional to their distance. If the same preson looks upwardly through a fog toward a group of objects at a distance, those objects may appear to be obscured to a lesser or greater extent by the fog than they would be if they were at the same elevation as the observer. Similarly, an individual looking downwardly onto a group of objects will sometimes notice that those objects which are at the lowest elevation appear to be obscured differently than are objects at the same distance on a horizontal plane.

However, for purposes of this discussion and for simulation purposes, it can be assumed that fog is comprised of small droplets of moisture or other similar particles suspended in the air, and that all of the particles are of substantially the same size. This is not necessarily true, but it will serve as a sufficiently good approximation for visual simulation and for the purposes of this discussion. In addition, it readily can be assumed that the density of the fog is constant within the range being simulated and its effect is directly proportional to the range. If, then, an observer at an elevated position looks toward the earth at an angle with the vertical, the density effect of the fog with respect to the objects he sees appears to increase directly as the secant of the angle his line-of-sight makes with the vertical. This is true since a constant fog density was assumed, the effect of the fog is directly proportional to distance, and the distance of the earth from the observer varies as the secant of the angle his line-of-sight makes with the vertical.

In the past, one of the popular forms of visual simulation has utilized television equipment. The television image generated by the equipment was projected upon a screen which served as the trainee's window or which was located immediately outside of his window. In this type of apparatus, a field of view would be generated showing objects, for example an airport and surrounding countryside, as they would normally appear to the trainee if he were in an aircraft looking downwardly at an angle toward the earth. And this view would appear to the pilot to be directly outside of his normal windshield. To simulate the effect of fog, the picture generated on the face of the cathode ray tube was generally lightened, causing the objects depicted to gradually fade into a field of reduced contrast. To achieve the effect of flying through scud, broken clouds, or a varying bank of fog, the brightness potential on the cathode ray tube would be varied at some arbitrary or "random" rate. However, it has not been feasible until now to generate a substantially constant fog simulation which appears true to life. It has been found that varying the effects of the fog produced on the face of the cathode ray tube as a function of the secant of the angle with the vertical that the line-of-sight of the observer makes does produce more realistic effects.

Referring now to the drawings in detail, FIG. 1 shows a system for simulating fog utilizing one aspect of this invention. A television camera 11 is positioned to view a model or an actual scene (not shown). The output of the camera 11 is transmitted through an amplifier 12 to one input of a mixer 13, the output of which is applied through a clipper 14 and an amplifier 15 to the beam control input of a cathode ray tube 16. An integrator 18 has its input connected through a switch 19 to the output of the amplifier 12, and its output connected to a control input of the clipper 14. A cathode ray tube 21 serving as a flying spot scanner includes a deflection yoke 22 and transmits the light generated on its face through a lens 23 to a film 24. The light passing through the film 24 is condensed by a lens 25 to fall upon the photo-sensitive surface of a photocell 26, the output of which is amplified by an amplifier 27. The output of the amplifier 27 is connected across a potentiometer 29 to ground, and through a slide contact 28 of the potentiometer 29 to a second input to the mixer 13. A sweep generator 31 supplies appropriate sweep potentials and currents to the TV camera 11, the yoke 17 of the cathode ray tube 16 and the yoke 22 of the cathode ray tube 21 to ensure the synchronization of the beams of all three devices. A potentiometer 32 having a slide contact 33 is connected between a source of positive potential and ground, and the slide contact 33 is connected to the control grid of the cathode ray tube 21. A roll servomotor 34 is connected mechanically to the yoke 22 of the flying spot scanner 21 to rotate the yoke 22 and thereby simulate roll. A pitch servomotor 35 is mechanically connected to the film 24 to move the film 24 and simulate pitch of an aircraft. And means for setting the maximum density of the fog is connected to the slide contact 28 of the potentiometer 29.

In operation, the system of FIG. 1 provides a visual display for use in training devices, such as training vehicles. In addition, the equipment shown in FIG. 1 will simulate special optical effects, such as fog. The camera 11 is used in any suitable manner to generate the electrical signals representative of a scene to be projected before the eyes of the trainee. In order to maintain FIG. 1 as simple as possible, the source of visual signals for the camera 11 has not been shown. However, the optical input to the camera may be from any of several old and well-known sources, such as from a suitable projector of either still or motion pictures, the view of a model which has been created to resemble an actual scene, or even the view of a scene as it really exists. The electrical signals generated by the camera 11 are amplified by the amplifier 12 and are applied to one input of the mixer 13. In the mixer 13, these video signals from the camera 11 are combined with potentials applied to the other input of the mixer 13 from the slide contact 28. These second potentials may be signals generated to achieve special effects. For example, the normal video signals applied to the first input of the mixer 13 may be combined therein with a fixed electrical potential which determines the brightness of the image finally projected by the face of the cathode ray tube 16 to produce the effects of darkness, fog, and similar weather conditions. These special effect potentials are initially generated by the photocell 26 in response to the output of the flying spot scanner 21.

Assume that a fog condition is to be simulated. The terrain or other scene to be shrouded in fog is placed before a camera 11, and the electrical signals representative of that scene are applied to one input of the mixer 13. At the same time, the cathode ray tube 21 generates an electron beam whose motion is controlled in synchronism with the beam of the camera 11. The initial brightness of the spot generated by the tube 21 is adjusted by the position of the slide 33 on the potentionmeter 32, which, in turn, determines the amplitude of the input potential applied to the cathode or control grid of the CRT 21. As the spot of light generated by the tube 21 moves across the face of the tube, it passes through the lens 23 and falls upon the film 24. The term "film 24" is really a generic term which is used herein to depict any type of transparent, semi-transparent, or translucent member which has light transmission characteristics predicated to develop the desired special effects. Consider, for example, the discussion above which indicated that the effects of fog upon the scene viewed by an observer varies with the secant of the angle made by the line-of-sight of the observer with the vertical from the earth's surface and also directly with the altitude of the observer from the surface of the earth. The film 24 has those light transmission characteristics which would satisfy this condition so that the effects of the beam of light generated by the flying spot scanner 21 are modified by the film 24 in accordance with the angle of the line-of-sight of the observer with the vertical from the surface of the earth. If the observer is presumed to be in an airplane looking down through his windshield at the surface of the earth, the slope of his line-of-sight changes when he looks through the top of the windshield from that when he looks through the bottom of the windshield. Thus, the fog effect looking straight ahead through the upper portion of the windshield would be different from the fog effect looking downward toward the earth from the lower portion of the windshield. The light density of the film 24 would be designed, in the case considered, to compensate for these variations in the effect of a fog with the angle at which the observer looks toward the scene before him. Thus, as the beam light from the flying spot scanner 21 moves from the upper portion of the screen down toward the lower portion of the screen, the amount of light which passes through the film 24 gradually decreases. The light which does pass through the film 24 is condensed by the lens 25 and falls upon the active surfaces in the photocell 26. The output of the photocell 26 is proportional to the amount of light which falls upon it. This output is applied through the slide contact 28 and a portion of the potentiometer 29 to the second input of the mixer 13. Thus, the mixer 13 receives two input signals, the video signals generated by the camera 11 and the potentials representative of the varying fog conditions as represented by the output of the photocell 26. The mixer 13 superimposes one upon the other, and the resultant output is clipped to a white intensity by the clipper 24 and applied through the amplifier 15 to the input of the electron gun in the cathode ray tube 16. The final image created on the face of the tube 16 includes the scene viewed by the camera 11 with the special effect produced by the photocell 26.

If the observer for whom the image on the face of the cathode ray tube 16 is being created is in an aircraft, the fog effect must be varied with his changes in altitude. The higher he rises, the greater the amount of fog through which he must look to see objects on the earth. This variation is accomplished by the setting of the slide 33 on the potentiometer 32 which selects the amplitude of the potential applied to the electron gun of the cathode ray tube 21 and, thereby, the intensity of the beam in the tube 21. A servomotor which operates with changes in altitude may be connected to the slide contact 33. When an aircraft rolls, in effect the windshield as well as the observer is tilted, and the scene now appears at an angle. To maintain a realistic image as the simulated ship in which the observer is located rolls, a roll servomotor 34 is mechanically connected to the yoke 22 on the cathode ray tube 21 to rotate the yoke and change the angle of the sweep. This has the effect of modifying the fog characteristics in a manner similar to the way they would appear in an actual aircraft in a roll condition. Similarly, as the aircraft pitches, the straight ahead line-of-sight of the observer changes its angular relationship with the vertical from the earth's surface. This has the effect of changing the slope of the line-of-sight and modifying the visual effect in accordance with the secant of the pitch angle. To compensate for this type of situation, a pitch servomotor 34 is mechanically connected to the film 24. The film 24 should have its density of light transmission vary in accordance with the secant of an angle which varies from zero through 90°. When the angle is at 90°, the film should appear virtually clear, but when the angle is zero degrees, the light transmission characteristics of the film should be at a minimum, with a gradual variation in these characteristics from the one extreme to the other in accordance with the secant. As the pitch servomotor 35 operates, the film 24 is moved in a vertical direction changing that portion of the film 24 which lies in the path of the beam of light from the cathode ray tube 21. The potentiometer 29 provides a constant load on the amplifier 27 and the signal output from the amplifier 27 to be varied with respect to the signal output from the camera 11 so that a good balance between the two signals can be achieved. Also, the potentiometer 29 permits an initial setting of the fog density in any problem. Preferably, the film 24 is curved so that the effect of the flying spot will be uniform for any point on the final display which is also curved.

In addition, an integrator 18, shown here in dashed lines, may be included to provide automatic effects in the system. The integrator 18 may be connected in the circuit or removed from the circuit by closing or opening the switch 19. When the integrator 18 is operative, it provides an electrical signal proportional to the integrated or average level of the video signal from the camera 11 to control the operation of the clipper 14. Thus, the integrator 18 may be set to automatically change the average brightness of the picture which appears on the face of tube 16 for either daytime or nighttime conditions. With additional controls or replaceable portions in the integrator 18, similar effects can be automatically achieved and selected to cover a wide range of operating conditions. The integrator 18 is shown in FIG. 1 in dashed lines to show that it is an optional or additional piece of equipment and may be or may not be used.

Figure 2:
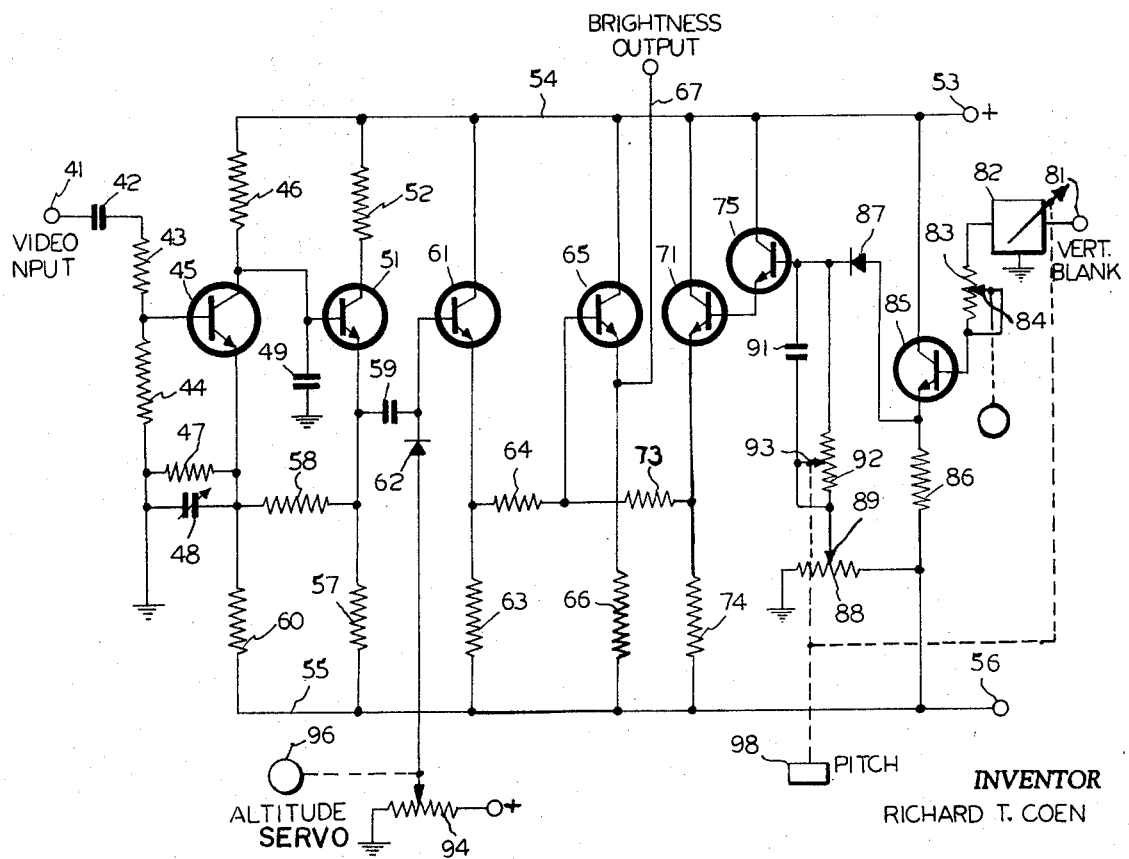
FIG. 2 is a schematic wiring diagram of a second system for visually simulating fog conditions.

FIG. 2 is a schematic circuit diagram of an all electronic system for accomplishing many of the results accomplished by the system of FIG. 1. Actually, the circuit shown in FIG. 2 does not include all of the material shown in FIG. 1, but the omitted elements are common to both systems. The video input which would come from a television camera, such as that shown at 11 in FIG. 1, applied to an input terminal 41 and through a capacitor 42 across a voltage divider comprising resistors 43 and 44. The junction of the resistors 43 and 44 is connected to the base electrode of a transistor 45 which comprises one stage of a video amplifier, the second stage of which is transistor 51. A resistor 46 connects the collector electrode of the transistor 45 to a B+ line 54 which includes a terminal 53 for connection to the positive side of a source of direct current. The emitter electrode of the transistor 45 is connected through a resistor 60 to a negative line 55 which includes a terminal 56 for connection to the negative side of the source of direct current. The emitter electrode of the transistor 45 is grounded through a parallel combination of a resistor 47 and an adjustable capacitor 48. A capacitor 49 serves as a decoupling capacitor for the base electrode of the transistor 51, having one side connected to the base electrode and the other side connected to ground. A resistor 52 connects the collector electrode of the transistor 51 to the B+ line 54, and the emitter electrode of the transistor 51 is connected to the negative line 55 by a resistor 57. A resistor 58 connects the emitters of the transistors 45 and 51 together. The output of the transistor 51 is coupled through a capacitor 59 to the input of an emitter follower 61 whose collector is directly connected to the B+ line 54, and whose emitter is connected through a resistor 63 to the B— line 55. A potentiometer 94 having a slide 95 is connected between a source of positive potential and ground with the slide 95 mechanically connected to a manually adjustable knob 96. Slide 95 is electrically connected to the anode of a diode clamp 62, the cathode of which is connected to the base electrode of the transistor 61. The emitter electrode of the transistor 61 is connected through a load resistor 63 to the negative bus 55, and the output from the transistor 61 is taken across the resistor 63 and through a coupling resistor 64 to the base electrode of a mixer transistor 65. The collector of the transistor 65 is directly connected to the positive bus 54, and the emitter electrode of the transistor 65 is connected through a load resistor 66 to the negative bus 55.

A second input to the circuit of FIG. 2 is the terminal 81 to which vertical blanking pulses are applied. The terminal 81 is connected to the input of an adjustable single-shot multivibrator 82. The output of the multivibrator 82 is applied through a potentiometer 83 having a slide contact 84 to the base electrode of the transistor 85. The collector electrode of the transistor 85 is directly connected to the positive bus 54, and the emitter electrode of that transistor is connected through a load resistor 86 to the negative bus 55. The output from the transistor 85 is taken across the resistor 86 and applied through a switching diode 87 to the base electrode of a transistor 75. The collector electrode of the transistor 75 is directly connected to the positive line 54, and its emitter electrode is directly connected to the base electrode of a transistor 71. The collector electrode of the transistor 71 is directly connected to the positive bus 54, and its emitter electrode is connected through a load resistor 74 to the negative bus 55. The output from the transistor 71 is taken across the resistor 74 and is applied through a resistor 73 to the base electrode of the transistor 65. The output from the transistor 65, which is the mixer transistor, is taken from the emitter electrode across a load resistor 66 which is connected to the negative bus 55. This output is applied to the brightness output line 67. The junction of the diode 87 and the base electrode of the transistor 75 is connected through a potentiometer 92 having a slide contact 93 to the slide contact 89 of a potentiometer 88. The potentiometer 88 has one end connected to the negative line 55 and the other end connected to ground. The slide contact 93 of the potentiometer 92 is connected to the slide contact 89 of the potentiometer 88. A capacitor 91 is connected between the base electrode of the transistor 75 and the slide contact 93. A pitch servomotor 98 is mechanically connected to the slide contacts 89 and 93, and the slide contact 84 is mechanically connected to a manually adjustable knob or lever.

In operation, two signals are simultaneously applied to the two input terminals 41 and 81 of the circuit of FIG. 2. The video signals from a television camera, such as the camera 11 shown in FIG. 1, are applied to the input terminal 41, and the vertical blanking pulses generated by a suitable source, such as the sweep generator 31 of FIG. 1, are, at the same time, applied to the input terminal 81. The video signals which are applied to terminal 41 are amplified by video amplifiers 45 and 51, and the amplified signals are applied to the base electrode of the emitter follower 61 across the diode clamp 62. The diode clamp 62 clamps the potential of the base electrode of the transistor 61 to the potential which appears at the setting of the potentiometer 94. This setting may be controlled manually by the knob 96. If desired, an altitude servomotor could be substituted for the knob 96. The output signal from the emitter follower 61 is applied through the resistor 64 to the input of the mixer 65.

At the same time that the video input signals are applied to the input terminal 41, vertical blanking pulses are applied to the other input terminal 81. Pulses are applied to the one-shot 82 which generates a pulse to be applied to the base electrode of the transistor 85 to render that transistor conductive. While transistor 85 is conductive, current flows through the transistor and the diode 87 to charge the capacitor 91. When the one-shot 82 recovers, the capacitor 91 discharges through the potentiometer 92 at a rate which is determined by the setting of the slide contact 93. The rate at which the capacitor 91 charges, and therefore the potential across it, is determined, at least in part, by the setting of the slide contact 84. As shown in FIG. 2, the input blanking pulses applied to the terminal 81 trigger the one-shot multivibrator 82. The single output pulse thus generated by the single shot 82 turns on the transistor 85 and supplies the energy to charge the capacitor 91. The one-shot 82 is made adjustable so that the width of its output pulse can be controlled. This type of trigger circuit is old and well known, and no detailed discussion is required here. The resistance value of the potentiometer 88 is kept sufficiently low that the capacitor 91 is fully charged by the pulse from the one-shot 82 regardless of its width. The pitch servomotor 98 is connected to the one-shot 82 to control the width of the output pulse. When the capacitor 91 is charged and the pulse from the one-shot decays, a potential which is falling while it discharges is applied to the input of the transistor 71 and develops an amplified exponential signal across the load resistor 74. The voltage developed across the resistor 74 is applied to the base electrode of the transistor 65 together with the amplified video signals, and the two signals are mixed by the transistor 65. The output potential which comprises the exponential potential superimposed on the video signals is developed across the load resistor 66 and is applied through the brightness output line 67 to the remainder of the system, which may include the clipper 14, the amplifier 15, and the cathode ray tube 16 as shown in FIG. 1. That portion of the view seen by the observer which is above the horizon is to have a constant appearance since no objects will be seen. Therefore, variations in the effects of the fog do not occur until the sweep in the viewing tube reaches the horizon. Changes in the pulse width from the output of the one-shot 82 determine when the changes in the fog effect begin.

The variations in the effects which would be produced to simulate variations in altitude can readily be achieved by adjustment of the slide contact 95 on the potentiometer 94. Since altitude does not vary to a great extent in normal operations, the simulated altitude can very often be set manually by means of the knob 96, and then left in this position for the remainder of the simulated mission. This may be done by an instructor. However, if desired training requires rapidly changing altitudes, or the effects of rapidly changing altitudes, the knob 96 could be replaced by a servometer which can be controlled by the operative controls of the simulated vehicle. In the electronics system disclosed in FIG. 2, the control of the system to produce a realistic effect of pitch is more complex. The pitch sevomotor 98 is mechanically connected to the one-shot 82. This should be connected to the single shot 82 so that it controls, to some extent, the period, or the operative cycle, of the single shot 82. As the period of the single shot is varied, it effectively varies the time duration of the pulse output from the one-shot 82 to vary the time when the peak potential to which the capacitor 91 will charge is reached. This has the effect of producing an exponential potential which begins only after the pulse decays and creates the impression of varying pitch angle in an aircraft. The variation in fog effect is not initiated until the picture sweep reaches the horizon. The time from the initiation of the picture frame varies with pitch. Thus, the time that the pulse output from the one-shot decays should also vary with pitch. In addition, the potentiometer 92 is also controlled by the pitch servomotor 98 to modify the discharge time constant of the capacitor 91 circuit and thereby modify the exponential potentials developed.

Of course, the circuit disclosed in FIG. 2 is only a portion of the entire system. The system as contemplated would include the additional elements which appear in the system shown in FIG. 1. As mentioned above, the output from the brightness output line 67 would be applied to a clipper, such as that shown at 14 in FIG. 1, through an amplifier 15 to control the beam in the cathode ray tube 16 or an equivalent apparatus. Further, the sweep generators, such as 31 in FIG. 1 and other service units, such as power supplies, would also be included in a complete system. Since these units and their connections into a system of this nature are not new and are obvious to those in the art, they have not been shown in the drawings or described in this specification to avoid unduly cluttering this application.

The above specification has described and illustrated a new and improved visual effect generator which is particularly suitable for use in simulation equipment. At least two embodiments of the contemplated system have been shown and described to set forth a completely electronic system and an electro-mechanical system. Each system has its advantages and disadvantages. The electronic system of FIG. 2 is, of course, simple to construct and maintain; it is rugged; and it is inexpensive in both construction and operation. On the other hand, the electro-mechanical system of FIG. 1 can produce more realistic results because the effects desired can be truly duplicated by the film 24 whereas they are only an approximation in the completely electronic system. On the other hand, the electro-mechanical system of FIG. 1 requires mechanically movable elements which will increase its cost and decrease its reliability. It is realized that the above description will indicate to those in the art additional ways in which the principles of this invention may be used without departing from its spirit. It is, therefore, intended that this invention be limited only by the scope of the appended claims.

What is claimed is:
1. A display system comprising:
 (a) cathode-ray tube display means for displaying an image, means for developing a first electrical signal representing an environmental situation;
 (b) means for generating a periodic electrical signal having an exponential waveform, said periodic signal generator comprising an electrical reactor and means for causing current to flow through said reactor;
 (c) means for combining said first electrical signal and said periodic signal to produce a third electrical signal;
 (d) and means coupling said third electrical signal to said cathode-ray tube display means to display a modified image of said environmental situation.

2. The system defined in claim 1 further including a pulse source, adjustable means for controlling the width of the pulse output from said pulse source in accordance with changes in one relation between an observer and the display, means for applying the output of said pulse source to said reactor, and additional adjustable means connected in series with said reactor for controlling the time constant of said reactor circuits in accordance with changes in another relation between said observer and said display.

3. An electrical system for displaying a scene and for producing special visual effects, said system comprising:
 (a) means for generating a first electrical signal representative of the scene to be displayed;
 (b) means for generating a second electrical signal to modify said first electrical signal in a prescribed manner to produce a special visual effect, said means for generating said second electrical signal comprising an optical filter having light transmission characteristics which vary over its area in a prescribed manner, means for projecting a beam of light onto selected portions of said filter, means to vary the position of said light beam with respect to said filter in accordance with changes in the relation of the observer with respect to the scene being displayed, and means for converting the light passing through said filter into said second electrical signal, said second electrical signal being proportional to the intensity of the light passed through said filter;
 (c) means for mixing said first and second electrical signals to produce a third electrical signal;
 (d) a cathode-ray tube display means;

(e) and means connecting said third electrical signal to said cathode-ray tube to generate a display of said scene with said special effects.

References Cited

UNITED STATES PATENTS

| | | | |
|---|---|---|---|
| 2,704,816 | 3/1955 | Fernsler | 313—76 |
| 2,883,763 | 4/1959 | Schaper | 35—12 |
| 2,938,949 | 5/1960 | Vosburgh et al. | 178—6.8 |
| 2,981,008 | 4/1961 | Davis et al. | 35—12 |
| 3,258,855 | 7/1966 | Flower et al. | 35—12 |
| 3,363,332 | 1/1968 | Akister et al. | 35—12 |

OTHER REFERENCES

IBM Technical Disclosure Bulletin, vol. 8, No. 1, June 1965, pp. 128–130.

ROBERT L. GRIFFIN, Primary Examiner

R. K. ECKERT, JR., Assistant Examiner

U.S. Cl. X.R.

35—12